Patented May 19, 1931

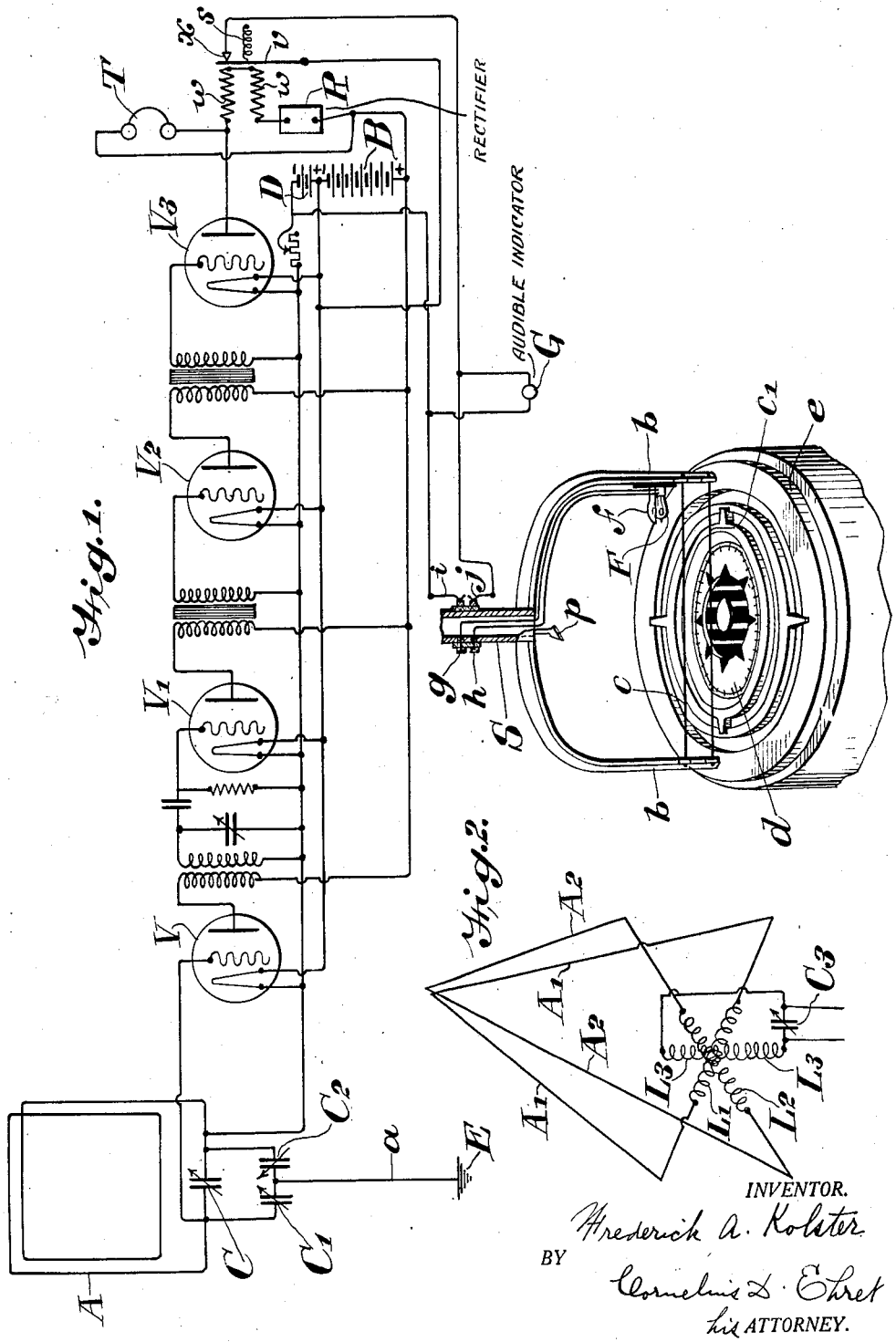

1,806,577

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

DIRECTIONAL RADIO SYSTEM

Application filed May 22, 1925. Serial No. 32,029.

My invention relates to directional radio systems, such as radio compass systems, utilizable for determining the direction or bearing of a radio beacon or other transmitting station, and for kindred purposes.

In accordance with my invention there are provided visual, audible or other indicating means controlled by the directional receiving system; and more particularly the indicating means affords indications or signals of different characters depending upon different positions of the directional means of the receiving system.

Further in accordance with my invention a visible indication is produced by an electric lamp or the like, which latter is carried by or movable with a bearing or direction indicating member, serving to illuminate a direction scale or compass card and in addition to visually indicate whether or not the direction indicating member is in position for indicating the direction of the distant radio beacon or transmitting station.

My invention resides in a method and apparatus of the character hereinafter described and claimed.

For an understanding of my method and for an illustration of one of the various forms my apparatus may take, reference is to be had to the accompanying drawings, in which:

Figure 1 is a diagrammatic view of directional receiving apparatus embodying my invention in association with bearing or direction indicating structure.

Fig. 2 is a diagrammatic view of a modified form of directional absorption structure utilizable in my system.

Referring to the drawings, one form of absorption structure having directional characteristics comprises the rotatable coil A, of suitable number of turns, included in a closed circuit with the variable tuning condenser C. In shunt to the condenser C are the variable condensers C1 and C2 to a point between which is connected the open or antenna path $a$ connected to earth or counter-capacity E, the closed circuit AC, and particularly the inductance coil A thereof, constituting a capacity area of the open antenna path.

While the foregoing is the preferred type of directional absorption structure, it may be of any other suitable or equivalent type, and as regards this present invention may be of well known character shown in Fig. 2 comprising the fixed antenna A1 and A2 disposed in vertical planes at right angles to each other, each antenna forming a closed loop if desired, and including respectively the inductance coils or primaries L1 and L2 with which co-acts the rotatable secondary winding or coil L3 as a goniometer coil, which latter is rotatable, and is connected in circuit with the tuning condenser C3.

Either the coil A of Fig. 1 or the coil L3 of Fig. 2 may be carried by and rotatable with the shaft S carrying the forked member $b$ carrying the sighting wires $c$ and $c1$ disposed adjacent and rotatable with respect to the compass card $d$, i. e. a directional or bearing scale, which may be fixed, or, as indicated, may be the movable card of a compass, such for example as used on board ship, and carried in gimbals supported by a binnacle or other support $e$.

Returning to Fig. 1, V is a thermionic vacuum tube of the audion type, operating as a radio frequency amplifier, having its input circuit connected to the terminals of the condenser C of Fig. 1 or C3 of Fig. 2, and its output circuit coupled to the input circuit of the detector tube V1 whose output circuit is coupled to the audio frequency amplifying tube V2 whose output circuit is coupled to the input circuit of the second stage audio frequency amplifier tube V3. This illustrates a typical form of receiving circuit utilizable, it being understood however that my invention is not limited in this regard, it being within the skill of the art to utilize any other suitable radio receiving apparatus.

In the output circuit of the tube V3 is the source of current or battery B, common to the output circuits of the other tubes, and a signal translating instrument such as the telephone T. There are also connected in the output circuit of the tube V3 the winding $w$ of an electromagnetic relay and a rectifier R of any suitable type for causing passage through the winding $w$ of uni-directional current. The armature $v$ of the relay is biased toward the contact $x$ by the spring $s$. In the circuit controlled by the armature $v$ and contact $x$ are the source of current or battery D, common to the filaments or cathodes of the vacuum tubes, and a signal or indicator such as the incandescent lamp F and if suitable or desirable other signals or indicators such for example as an audible indicator G, as a buzzer or electric bell.

The lamp F may be located wherever suitable or desirable. In the example illustrated, however, it is mounted upon the pointing or indicating structure as upon one of the arms $b$ above and adjacent the sight wires $c$ and $c1$, and illuminating the scale or card beneath. A shade or reflector $f$ may direct the light downwardly and simultaneously shield the eyes of the observer. The conductors from the terminals of the socket of the lamp F connect with slip rings $g$ and $h$ carried by and insulated from the shaft S; and upon these slip rings bear respectively the brushes $i$ and $j$ connecting the lamp F in the circuit controlled by the relay armature $v$.

When the condensers C1 and C2 are so adjusted that the closed circuit including the coil A is electrically symmetrical with respect to the open antenna path $a$, there is no interchange of received energy between the closed circuit and open path, and the coil A may be rotated to a position of critical indication as regards the direction of the distant transmitting station or radio beacon. When either or both of the condensers C1, C2 is or are adjusted to cause dissymmetry of the closed circuit with respect to the antenna path, a uni-directional characteristic is obtainable whereby the sense of direction of the distant beacon or transmitter is determinable, and this sense of direction may be indicated by the pointer $p$ carried upon the shaft S upon which is carried the coil A.

The foregoing are the usual modes of use of the coil A in a radio compass it being desirable, generally, that the plane of the coil A be normal to the direction of propagation of the received radio energy whereby no energy is absorbed by the coil A, such minimum or zero being readily and sharply discernible by the fact that silence in the telephone T is more readily discernible than a critical maximum sound.

Assuming the coil A has been moved to position in which its plane is normal to the direction of the distant beacon or transmitter, there is small or zero change of anode circuit current in the relay winding $w$ and the spring $s$ holds the armature $v$ in engagement with the contact $x$ causing the lamp F to glow continuously, thereby showing that the sight wires $c$, $c1$ are in true direction indicating position, giving light to assist in reading the direction on the scale or card $d$, and, furthermore, checking the critical audible indication available by telephone T.

When the coil A is not in true direction indicating position the armature $v$, due to greater current through the winding $w$, will be attracted away from the contact $x$, remaining away from the contact $x$ for long and short periods corresponding with the dashes and dots automatically transmitted by the radio beacon or transmitted by a distant radio telegraphic station. The lamp F will correspondingly flicker giving a visual indication of the dots and dashes and therefore an identification of the distant beacon.

Accordingly before the coil A reaches the critical or true direction indicating position the indicating means, as F or G will indicate that the true direction is not yet indicated, and the operator continues to move the coil A to position where the indication remains continuous, as by continuous glowing of the lamp F, corresponding with the true direction-indicating position of the coil A.

While the telephone T may generally afford a more critical determination of direction, nevertheless the lamp F or other indicating means serves the useful purposes above described.

In case the coil A is utilized in determining bearing by pointing its plane at the distant beacon or transmitter there is absorbed in the coil A a maximum of received energy with resultant maximum current in the relay winding $w$ for direction indicating position of the coil A. When so utilizing the coil A the contact $x$ may be transposed to the opposite side of the armature $v$ from that illustrated, whereby upon maximum current in the winding $w$ the continuous indication will be given, as by lamp F, and for lesser currents, corresponding with other positions of the coil A, the spring $s$ will withdraw the armature against a back stop.

The operation will be that of the general character hereinbefore described also in those cases where the condensers C1 and C2 of Fig. 1 are so adjusted that there is dissymmetry of the closed circuit with respect to the antenna path, there being similarity in the sense that the combined effects of the energy absorbed in the closed circuit and the energy absorbed in the open or antenna path will control the relay and therethrough the visual, audible or other indicating or signal means.

If desired, the relay armature $v$, contact $x$ and spring $s$ may be so related to each other as to reverse the control of the circuit including the lamp F, whereby it is extinguished when the coil A or L3 is in direction indicating position.

What I claim is:

1. A radio compass comprising an electrical system having a non-uniform directional characteristic, a member comprised in said electrical system movable to positions related to the direction of propagation of the received energy, indicating means, a circuit controlling said indicating means, and means controlled by said electrical system effecting continued closure of said circuit when said movable member is in direction indicating postion normal to the direction of propagation of the received energy and effecting rupture of said circuit when said movable member is in a different position.

2. A radio compass comprising an electrical system having a non-uniform directional characteristic, a member comprised in said electrical system movable to positions related to the direction of propagation of the received energy, indicating means, a circuit controlling said indicating means, and means controlled by said electrical system effecting closure of said circuit when said movable member is in direction indicating position and while in said position effecting ruptures of said circuit to effect indications in correspondence with the received signals when said movable member is in different position.

3. A radio compass comprising an electrical system having a non-uniform directional characteristic, a rotatable bearing coil comprised in said electrical system and absorbing energy directly from the natural media, a direction scale, indicating means movable in unison with said rotatable coil and co-acting with said scale, an electric lamp movable with said indicating means, and a circuit including said lamp controlled by said electrical system.

4. A radio compass comprising an electrical system having a non-uniform directional characteristic, a member comprised in said electrical system movable to positions related to the direction of propagation of the received energy, a direction scale, indicating means movable in unison with said movable member and co-acting with said scale, a thermionic vacuum tube associated with said electrical system, a source of current for heating the cathode of said tube, an electric lamp movable with said indicating means, and a circuit including said source of current and said lamp controlled by said electrical system.

5. A radio compass comprising an electrical system having a non-uniform directional characteristic, a member comprised in said electrical system movable to positions related to the direction of propagation of the received energy, direction indicating means movable in unison with said movable member, a thermionic vacuum tube comprised in said electrical system, a relay winding and rectifying means controlled by the anode circuit of said tube, a signal, and a circuit controlling said signal and controlled by said relay winding.

6. A radio compass comprising an electrical system having a non-uniform directional characteristic, a member comprised in said electrical system movable to positions related to the direction of propagation of the received energy, direction indicating means movable in unison with said movable member, a thermionic vacuum tube comprised in said electrical system, a relay winding and rectifying means controlled by the anode circuit of said tube, an electric lamp movable with said indicating means, and a circuit controlling said lamp and controlled by said relay winding.

7. In the art of determining the bearing of a source of electro-radiant energy, the method which comprises absorbing electro-radiant energy from the source in an electrical system having a non-uniform directional characteristic, moving a member comprised in said electrical system to position related to the direction of propagation of the received energy, moving a sighting device and a lamp in unison with said movable member with respect to a bearing scale, and effecting control of said lamp by said electrical system in accord with movement of said movable member.

In testimony whereof I have hereunto affixed my signature this 19th day of May, 1925.

FREDERICK A. KOLSTER.